Jan. 13, 1942.   P. A. SANTORO   2,269,486
SELF-SEALING GASKET
Filed July 15, 1941

INVENTOR.
Paul A. Santoro
BY
ATTORNEYS.

UNITED STATES PATENT OFFICE 2,269,486

SELF-SEALING GASKET

Paul A. Santoro, Bronx, N. Y.

Application July 15, 1941, Serial No. 402,543

1 Claim. (Cl. 288—23)

(Granted under the act of March 3, 1883, as amended April 30, 1928; 370 O. G. 757)

This invention relates to gaskets and it has a particular relation to gaskets for high pressure steam pipe lines.

The principal object of the invention is the provision of a gasket of the character described which is adapted to be clamped between two pipe sections and which is of hollow construction so as to be expansible under the pressure in the pipe line for the purpose of making intimate sealing contact with the adjacent ends of the sections and also expansible in response to contraction of the pipe sections with a reduction in the temperature thereof.

Another object of the invention is the provision of a gasket of hollow construction and expansible in response to pressure in the pipe line, said gasket being formed with a series of annular ribs or ridges on its axially outer faces adapted to become embedded in a liner or secondary gasket of relatively soft material interposed between said faces and the ends of the pipe sections.

A further object of the invention is the provision of a gasket of the self sealing type constructed of two metallic rings welded together around their outer circumferential edges, one of said rings having its axially inner face recessed and communicating with the interior of the pipe line so that the pressure therein will tend to expand the gasket into intimate sealing contact with the ends of the pipe sections.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there are shown in the accompanying drawing, means for carrying the invention into practical use, without limiting the improvements in their useful application to the particular construction, which, for the purpose of explanation, have been made the subject of illustration.

Figure 1:
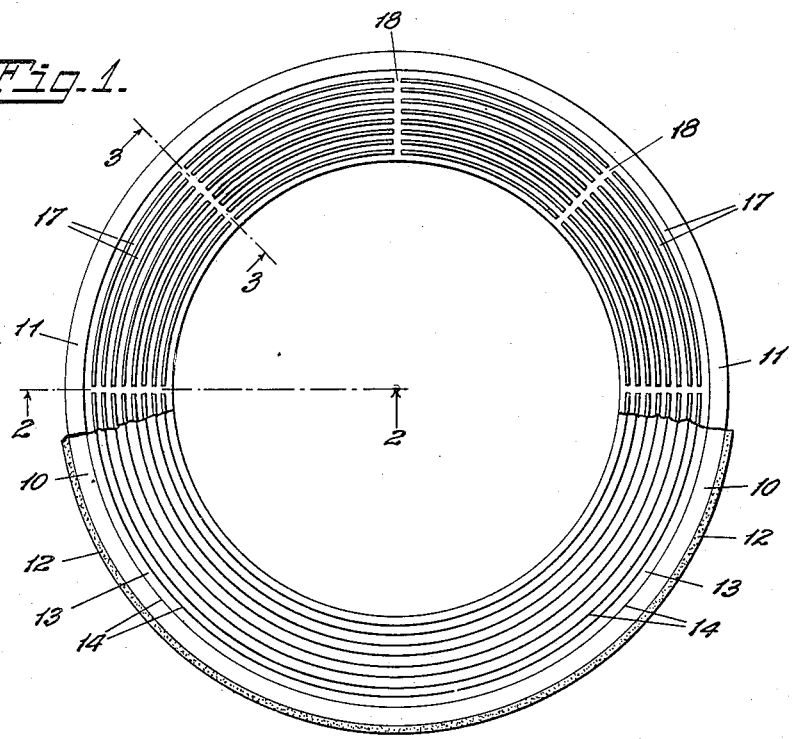
Fig. 1 is an elevational view of a gasket constructed in accordance with the invention with a portion of one of the ring members broken away.
Figure 2:
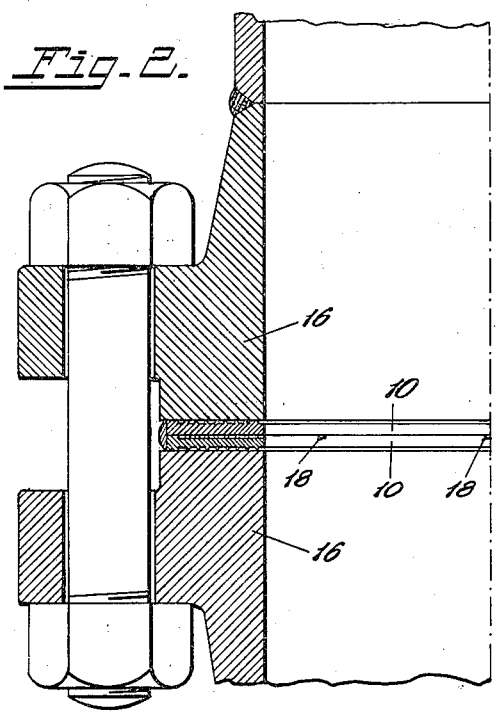
Fig. 2 is a longitudinal sectional view taken on line 2—2 of Fig. 1.
Figure 3:
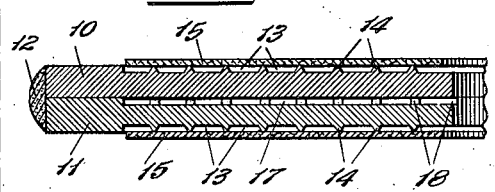
Fig. 3 is a fragmentary sectional view on a larger scale taken on line 3—3 of Fig. 1.

Referring to the drawing a gasket embodying the invention is shown as comprising two metallic ring members 10 and 11 disposed in face to face relation and welded together around their outer circumferences, as indicated at 12. The axially outer faces of the ring members have a plurality of grooves 13 machined therein so as to form a plurality of relatively narrow concentric serrations or ribs 14 (Fig. 3), which are adapted to bite into asbestos packings or liners 15 when the gasket is clamped between two sections 16 of a high pressure pipe line, as shown in Fig. 2.

The axially inner abutting surfaces of one of the ring members 10 or 11 has a plurality of concentric spaced grooves 17 machined therein which communicate with one another and with the interior of the pipe line through a plurality of radially extending grooves 18.

It will be apparent from the above description that the construction is such that when the gasket is clamped between the ends of two pipe sections, the fluid in the line will flow through the radial grooves 18 and into the concentric grooves 17 and the pressure thereof will tend to spring the ring members apart with a bellows action. This will force the outer ribs 14 further into the outer liners 15, and continue to maintain the sealing contact with the pipe sections 16 and also provide a series of circular line contacts with the ends of the pipe sections.

The reduction of all stresses is one of the most important advantages of the improved gasket. It has been demonstrated that so far as maintaining a tight joint is concerned, practically no initial bolt stress is required.

The possibility of obtaining a positively tight joint at a bolt stress of 20,000 p. s. i. or less eliminates, as a major problem, the creep of bolt material, as well as high hub and flange stresses. An opportunity for a reduction in weight is thus afforded.

The asbestos packing herein employed not only withstands high temperature but insures that a positive seal is obtained notwithstanding the existence of any irregularities, both in the serrations 14 and in the flange faces, such as nicks, burrs, etc., caused in handling. The design is simple, and requires no new or special machinery for fabrication.

It will be understood that the above description and accompanying drawing comprehend only the general and preferred embodiment of the invention and that various changes in construction, proportion and arrangement of the parts may be made within the scope of the appended claim without sacrificing any of the advantages of the invention.

The invention described herein may be manufactured and used by or for the Government of the United States of America for governmental purposes without the payment of any royalties thereon or therefor.

I claim:

A gasket for high pressure pipe lines comprising a pair of metallic rings welded together around their outer circumferences and adapted to be clamped between two pipe sections, a liner disposed on each side of said pair of rings, said rings having a plurality of concentric ribs on their axially outer surfaces and one of said rings having a plurality of concentric annular grooves formed in its axially inner surface and a plurality of radial grooves intersecting said annular grooves for establishing communication between the interior of said sections and said annular grooves, whereby said rings may spring axially in response to pressure in the pipe line and to cause said ribs to bite into said liners and form intimate sealing contact with the adjacent ends of said pipe sections.

PAUL A. SANTORO.